United States Patent
Tanemura et al.

(10) Patent No.: US 9,478,241 B1
(45) Date of Patent: Oct. 25, 2016

(54) THERMALLY-ASSISTED MAGNETIC RECORDING HEAD HAVING INCLINED MAIN MAGNETIC POLE AND CORE

(71) Applicants: Shigeki Tanemura, Milpitas, CA (US); Yoshitaka Sasaki, Los Gatos, CA (US); Hiroyuki Ito, Milpitas, CA (US); Xuhui Jin, San Jose, CA (US); Hideo Mamiya, Milpitas, CA (US); Yukinori Ikegawa, Milpitas, CA (US)

(72) Inventors: Shigeki Tanemura, Milpitas, CA (US); Yoshitaka Sasaki, Los Gatos, CA (US); Hiroyuki Ito, Milpitas, CA (US); Xuhui Jin, San Jose, CA (US); Hideo Mamiya, Milpitas, CA (US); Yukinori Ikegawa, Milpitas, CA (US)

(73) Assignee: HEADWAY TECHNOLOGIES, INC., Milpitas, CA (US)

(*) Notice: Subject to any disclaimer, the term of this patent is extended or adjusted under 35 U.S.C. 154(b) by 0 days.

(21) Appl. No.: 15/019,428

(22) Filed: Feb. 9, 2016

(51) Int. Cl.
| | |
|---|---|
| *G11B 11/00* | (2006.01) |
| *G11B 5/48* | (2006.01) |
| *G11B 5/31* | (2006.01) |
| *G11B 5/60* | (2006.01) |
| G11B 5/00 | (2006.01) |
| G11B 11/105 | (2006.01) |

(52) U.S. Cl.
CPC .............. *G11B 5/4866* (2013.01); *G11B 5/314* (2013.01); *G11B 5/6088* (2013.01); *G11B 11/1058* (2013.01); *G11B 11/10543* (2013.01); *G11B 11/10554* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,284,637 B2 | 10/2012 | Jin et al. | |
| 8,456,968 B1 | 6/2013 | Sasaki et al. | |
| 8,614,932 B1 * | 12/2013 | Sasaki | G11B 5/314 369/13.17 |
| 8,619,517 B1 * | 12/2013 | Sasaki | B82Y 20/00 369/13.33 |
| 8,711,663 B1 * | 4/2014 | Sasaki | G11B 5/314 369/13.13 |
| 8,760,809 B1 * | 6/2014 | Sasaki | G11B 5/314 360/125.31 |
| 9,378,762 B1 * | 6/2016 | Sasaki | G11B 5/4866 |
| 9,396,749 B2 * | 7/2016 | Asselin | G11B 5/314 |
| 2007/0139818 A1 * | 6/2007 | Shimazawa | G11B 5/3136 360/125.31 |
| 2010/0172220 A1 * | 7/2010 | Komura | B82Y 10/00 369/13.33 |
| 2014/0247706 A1 * | 9/2014 | Sasaki | G11B 13/08 369/13.33 |
| 2015/0117168 A1 * | 4/2015 | Matsumoto | G11B 5/23 369/13.17 |
| 2015/0124575 A1 * | 5/2015 | Sasaki | G11B 5/3133 369/13.33 |

* cited by examiner

*Primary Examiner* — Tan X Dinh
(74) *Attorney, Agent, or Firm* — Oliff PLC (57) ABSTRACT

A thermally-assisted magnetic recording head includes a main pole, a waveguide, and a plasmon generator. The waveguide includes a core and a cladding. The main pole and the core are located on the same side in the direction of travel of a recording medium relative to the plasmon generator. The main pole has a first end face located in the medium facing surface, and a second end face opposite to the first end face. The core has a front end face opposed to the second end face of the main pole. The cladding includes an interposition section interposed between the front end face of the core and the second end face of the main pole. The front end face of the core and the second end face of the main pole are inclined with respect to the medium facing surface.

6 Claims, 7 Drawing Sheets

THERMALLY-ASSISTED MAGNETIC RECORDING HEAD HAVING INCLINED MAIN MAGNETIC POLE AND CORE

BACKGROUND OF THE INVENTION

1. Field of the Invention

The present invention relates to a thermally-assisted magnetic recording head for use in thermally-assisted magnetic recording to write data on a recording medium with the coercivity thereof lowered by irradiating the recording medium with near-field light.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head unit including a magnetoresistive element (hereinafter, also referred to as MR element) for reading and a write head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium. The medium facing surface has an air inflow end (a leading end) and an air outflow end (a trailing end).

Here, the side of the positions closer to the leading end relative to a reference position will be referred to as the leading side, and the side of the positions closer to the trailing end relative to the reference position will be referred to as the trailing side. The leading side is the rear side in the direction of travel of the recording medium relative to the slider. The trailing side is the front side in the direction of travel of the recording medium relative to the slider.

To increase the recording density of a magnetic recording device, it is effective to make the magnetic fine particles of the recording medium smaller. Making the magnetic fine particles smaller, however, disadvantageously reduces the thermal stability of magnetization of the magnetic fine particles. To resolve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To resolve the foregoing problems, there has been proposed a technology called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near the medium facing surface of the slider.

U.S. Pat. Nos. 8,284,637 B2 and 8,456,968 B1 each disclose a technology in which the surface of the core of the waveguide and the surface of the plasmon generator are arranged to face each other with a gap therebetween, so that evanescent light that occurs from the surface of the core based on the light propagating through the core is used to excite surface plasmons on the plasmon generator to generate near-field light based on the excited surface plasmons.

In a thermally-assisted magnetic recording head that employs a plasmon generator as a source of generation of near-field light, the write head unit includes a coil, a main pole and the plasmon generator. The coil produces a magnetic field corresponding to data to be written on a recording medium. The main pole has an end face located in the medium facing surface. The main pole passes a magnetic flux corresponding to the magnetic field produced by the coil, and produces a write magnetic field from the aforementioned end face. The plasmon generator includes a near-field light generating section located in the medium facing surface. To provide a magnetic recording device with higher linear recording density, it is preferred that the end face of the main pole and the near-field light generating section of the plasmon generator be located close to each other in the medium facing surface.

U.S. Pat. Nos. 8,284,637 B2 and 8,456,968 B1 each disclose a structure in which at least part of the main pole is located between the medium facing surface and the front end face of the core closest to the medium facing surface. This structure allows the end face of the main pole and the near-field light generating section of the plasmon generator to be located close to each other in the medium facing surface.

In a thermally-assisted magnetic recording head, the plasmon generator and the main pole become hot due to heat generated by the plasmon generator. This can cause the plasmon generator to be deformed or broken, and cause the main pole to be oxidized or corroded, thus shortening the life of the thermally-assisted magnetic recording head.

The aforementioned structure disclosed in U.S. Pat. Nos. 8,284,637 B2 and 8,456,968 B1 causes the main pole to rise in temperature due to not only the heat generated by the plasmon generator but also light that emerges from the front end face of the core and enters the main pole. The aforementioned structure thus has the problem that the main pole is particularly susceptible to damage.

OBJECT AND SUMMARY OF THE INVENTION

It is an object of the present invention to provide a thermally-assisted magnetic recording head in which the end face of the main pole and the near-field light generating section of the plasmon generator are located close to each other in the medium facing surface, the thermally-assisted magnetic recording head allowing for prevention of damage to the main pole.

A thermally-assisted magnetic recording head of the present invention includes: a medium facing surface configured to face a recording medium; a main pole; a waveguide; and a plasmon generator. The main pole produces a write magnetic field for use to write data on the recording medium. The waveguide includes a core through which light propagates, and a cladding provided around the core. The plasmon generator includes a near-field light generating section located in the medium facing surface. The plasmon generator is configured so that a surface plasmon is excited on the plasmon generator based on the light propagating through the core, and the near-field light generating section generates near-field light based on the surface plasmon.

The main pole and the core are located on the same side in the direction of travel of the recording medium relative to the plasmon generator. The main pole has a first end face located in the medium facing surface, and a second end face located opposite to the first end face. The core has a front end face opposed to the second end face of the main pole. The cladding includes an interposition section interposed between the front end face of the core and the second end face of the main pole.

The front end face of the core is inclined with respect to the medium facing surface such that the distance from the medium facing surface to any point on the front end face decreases with decreasing distance from the point on the front end face to the plasmon generator. The second end face of the main pole is inclined with respect to the medium facing surface such that the distance from the medium facing surface to any point on the second end face decreases with decreasing distance from the point on the second end face to the plasmon generator.

In the thermally-assisted magnetic recording head of the present invention, each of the front end face of the core and the second end face of the main pole may form an inclination angle of 30° to 60° with respect to the medium facing surface.

In the thermally-assisted magnetic recording head of the present invention, the core may have an evanescent light generating surface configured to generate evanescent light based on the light propagating through the core, and the plasmon generator may include a plasmon exciting section located at a predetermined distance from the evanescent light generating surface and facing the evanescent light generating surface. In this case, the plasmon generator is configured so that a surface plasmon is excited on the plasmon exciting section through coupling with the evanescent light generated by the evanescent light generating surface, the surface plasmon propagates to the near-field light generating section, and the near-field light generating section generates near-field light based on the surface plasmon.

The plasmon generator may have an inclined surface located opposite to the plasmon exciting section. The inclined surface is inclined with respect to a direction perpendicular to the medium facing surface such that the distance from the plasmon exciting section to any point on the inclined surface decreases with decreasing distance from the point on the inclined surface to the medium facing surface.

The thermally-assisted magnetic recording head of the present invention may further include a heat sink located on a side of the plasmon generator opposite to the main pole.

The thermally-assisted magnetic recording head may further include a reflection film interposed between the interposition section and the second end face of the main pole.

In the thermally-assisted magnetic recording head of the present invention, the main pole and the core are located on the same side in the direction of travel of the recording medium relative to the plasmon generator. The present invention thus allows the first end face of the main pole and the near-field light generating section of the plasmon generator to be located close to each other in the medium facing surface.

In the present invention, the cladding includes the interposition section interposed between the front end face of the core and the second end face of the main pole. The front end face of the core and the second end face of the main pole are inclined with respect to the medium facing surface. The present invention thus allows for a reduction in the amount of light that emerges from the front end face of the core and enters the main pole, thereby allowing for prevention of damage to the main pole.

Other and further objects, features and advantages of the present invention will appear more fully from the following description.

DETAILED DESCRIPTION OF THE PREFERRED EMBODIMENTS

First Embodiment

Figure 3:
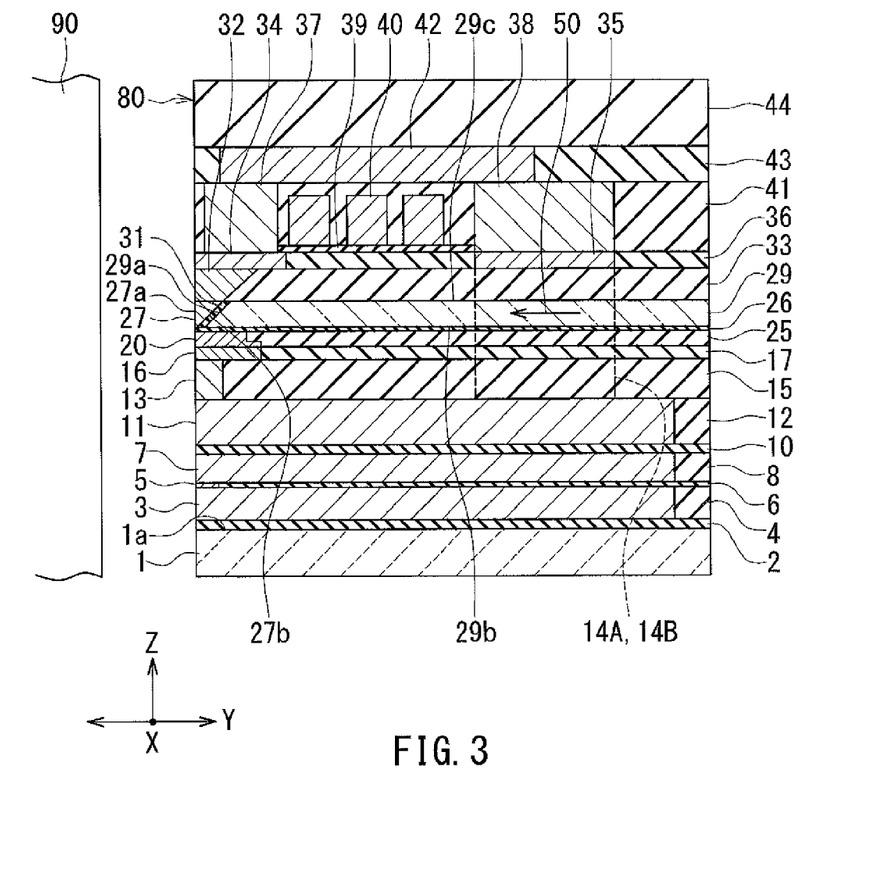
FIG. 3 is a cross-sectional view showing the configuration of the thermally-assisted magnetic recording head according to the first embodiment of the invention.
Figure 4:
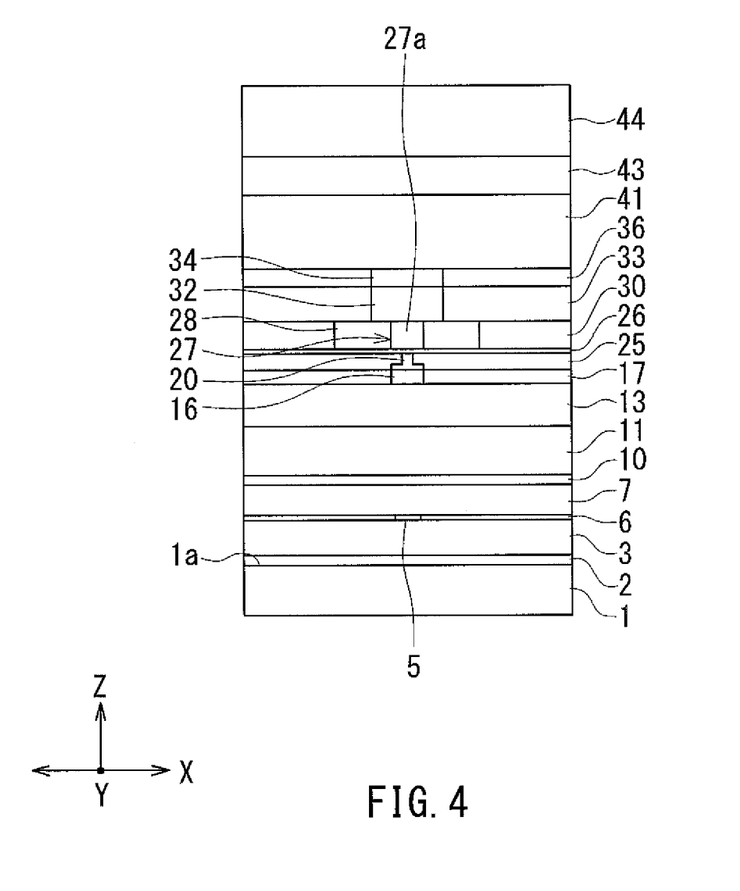
FIG. 4 is a front view showing the medium facing surface of the thermally-assisted magnetic recording head according to the first embodiment of the invention.

Preferred embodiments of the present invention will now be described in detail with reference to the drawings. First, reference is made to FIG. 3 and FIG. 4 to describe the configuration of a thermally-assisted magnetic recording head according to a first embodiment of the invention. FIG. 3 is a cross-sectional view showing the configuration of the thermally-assisted magnetic recording head. FIG. 4 is a front view showing the medium facing surface of the thermally-assisted magnetic recording head.

The thermally-assisted magnetic recording head according to the present embodiment is intended for use in perpendicular magnetic recording, and is incorporated in a slider configured to fly over the surface of a rotating recording medium 90. The slider has a medium facing surface 80 configured to face the recording medium 90. When the recording medium 90 rotates, an airflow passing between the recording medium 90 and the slider causes a lift to be exerted on the slider. The lift causes the slider to fly over the surface of the recording medium 90.

As shown in FIG. 3, the thermally-assisted magnetic recording head has the medium facing surface 80. Here, we define X direction, Y direction, and Z direction as follows. The X direction is the direction across the tracks of the recording medium 90, i.e., the track width direction. The Y direction is a direction perpendicular to the medium facing surface 80. The Z direction is the direction of travel of the recording medium 90 as viewed from the slider. The X, Y, and Z directions are orthogonal to one another.

As shown in FIG. 3 and FIG. 4, the thermally-assisted magnetic recording head includes: a substrate 1 formed of a ceramic material such as aluminum oxide-titanium carbide (Al$_2$O$_3$—TiC) and having a top surface 1a; an insulating layer 2 formed of an insulating material and lying on the top surface 1a of the substrate 1; a bottom shield layer 3 formed of a magnetic material and lying on the insulating layer 2; and an insulating layer 4 lying on the insulating layer 2 and surrounding the bottom shield layer 3. The insulating layers 2 and 4 are formed of alumina (Al$_2$O$_3$), for example. The Z direction is also a direction perpendicular to the top surface 1a of the substrate 1.

The thermally-assisted magnetic recording head further includes: a magnetoresistive (MR) element 5 serving as a read element lying on the bottom shield layer 3; an insulating layer 6 lying on the bottom shield layer 3 and the insulating layer 4 and surrounding the MR element 5; a top shield layer 7 formed of a magnetic material and lying on the MR element 5 and the insulating layer 6; and an insulating layer 8 lying on the insulating layer 6 and surrounding the top shield layer 7. The insulating layers 6 and 8 are formed of alumina, for example. The parts from the bottom shield layer 3 to the top shield layer 7 constitute a read head unit.

An end of the MR element 5 is located in the medium facing surface 80. The MR element 5 may be an element formed of a magneto-sensitive film that exhibits a magnetoresistive effect, such as a giant magnetoresistive (GMR) element or a tunneling magnetoresistive (TMR) element. Each of the GMR and TMR elements typically includes a free layer, a pinned layer, a spacer layer located between the free layer and the pinned layer, and an antiferromagnetic layer located on a side of the pinned layer opposite to the spacer layer. The free layer is a ferromagnetic layer whose magnetization direction varies in response to a signal magnetic field. The pinned layer is a ferromagnetic layer whose magnetization direction is pinned. The antiferromagnetic layer is to pin the magnetization direction of the pinned layer by means of exchange coupling with the pinned layer. For GMR elements, the spacer layer is a nonmagnetic conductive layer. For TMR elements, the spacer layer is a tunnel barrier layer.

The GMR element may be of either the current-in-plane (CIF) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element. When the MR element 5 is a TMR element or a CPP-type GMR element, the bottom shield layer 3 and the top shield layer 7 may also serve as electrodes for feeding a sense current to the MR element 5. When the MR element 5 is a CPP-type GMR element, insulating films are respectively provided between the MR element 5 and the bottom shield layer 3 and between the MR element 5 and the top shield layer 7, and two leads are provided between these insulating films in order to feed the sense current to the MR element 5.

The thermally-assisted magnetic recording head further includes: a nonmagnetic layer 10 formed of a nonmagnetic material and lying on the top shield layer 7 and the insulating layer 8; a return pole layer 11 formed of a magnetic material and lying on the nonmagnetic layer 10; and an insulating layer 12 lying on the nonmagnetic layer 10 and surrounding the return pole layer 11. The return pole layer 11 has an end face located in the medium facing surface 80. The nonmagnetic layer 10 and the insulating layer 12 are formed of alumina, for example.

The thermally-assisted magnetic recording head further includes: a shield 13 lying on a first portion of the top surface of the return pole layer 11, the first portion being located near the medium facing surface 80; two coupling sections 14A and 14B lying on two second portions of the top surface of the return pole layer 11, the two second portions being located away from the medium facing surface 80; and an insulating layer 15 lying on the insulating layer 12 and a portion of the top surface of the return pole layer 11 other than the first and second portions. The shield 13 and the coupling sections 14A and 14B are formed of a magnetic material. Each of the coupling sections 14A and 14B has a first layer lying on the return pole layer 11, and a second, a third, and a fourth layer stacked in this order on the first layer. The first layers of the coupling sections 14A and 14B are embedded in the insulating layer 15. The first layer of the coupling section 14A and the first layer of the coupling section 14B are arranged to be adjacent in the track width direction (the X direction). The insulating layer 15 is formed of alumina, for example.

The thermally-assisted magnetic recording head further includes: a heat sink 16 located near the medium facing surface 80 and lying on the shield 13 and part of the top surface of the insulating layer 15; and an insulating layer 17 provided around the heat sink 16. The heat sink 16 is formed of a material having a high thermal conductivity. More specifically, the heat sink 16 is formed of, for example, one of Ru, Cr, Cu, Au, Al, W and Mo, or an alloy composed of two or more of these elements. Alternatively, the heat sink 16 may be formed of AlN or SiC. The insulating layer 17 is formed of alumina, for example.

The thermally-assisted magnetic recording head further includes a plasmon generator 20 lying on the heat sink 16, and a dielectric layer 25 provided around the plasmon generator 20. The plasmon generator 20 is formed of metal. More specifically, the plasmon generator 20 is formed of, for example, one of Au, Ag, Cu, Al, Pd, Ru, Pt, Rh and Ir, or an alloy composed of two or more of these elements. The dielectric layer 25 is formed of alumina, for example. The second layers of the coupling sections 14A and 14B are embedded in the insulating layer 17 and the dielectric layer 25. The shape of the plasmon generator 20 will be described in detail later.

The heat sink 16 has the function of dissipating heat generated by the plasmon generator 20 outwardly from the plasmon generator 20. In the present embodiment, in particular, the heat sink 16 is in contact with the plasmon generator 20 in the medium facing surface 80. This enables the heat sink 16 to perform its function more effectively.

Figure 2:
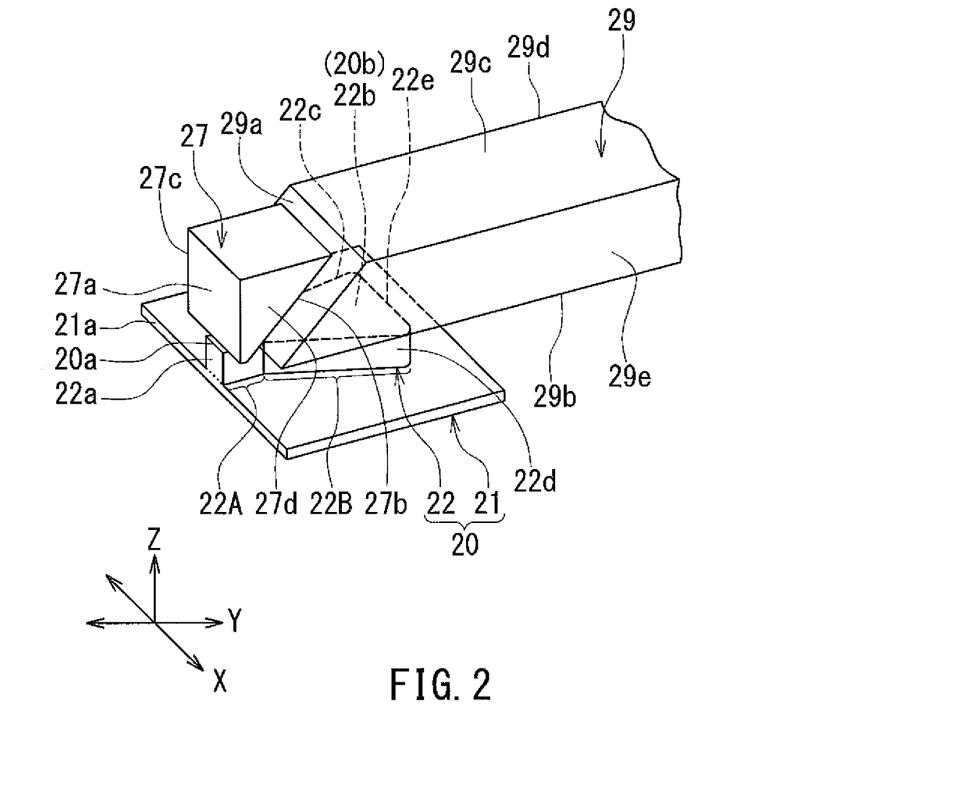
FIG. 2 is a perspective view showing the main part of the thermally-assisted magnetic recording head according to the first embodiment of the invention.

The thermally-assisted magnetic recording head further includes a waveguide. The waveguide includes a core 29 through which light propagates, and a cladding provided around the core 29. The core 29 has: a front end face 29a facing the medium facing surface 80; an evanescent light generating surface 29b, which is a bottom surface; a top surface 29c; and two side surfaces 29d and 29e connecting the evanescent light generating surface 29b and the top surface 29c. The side surfaces 29d and 29e are shown in FIG. 2 to be described later. The front end face 29a is located at a distance from the medium facing surface 80.

The cladding includes cladding layers 26, 30 and 33 and an interposition section 31. The cladding layer 26 lies on the plasmon generator 20 and the dielectric layer 25. The core 29 lies on the cladding layer 26. The cladding layer 30 lies on the cladding layer 26 and covers the side surfaces 29d and 29e of the core 29. The interposition section 31 covers the front end face 29a of the core 29. The cladding layer 33 lies over the top surface 29a of the core 29 and the top surfaces of the cladding layer 30 and the interposition section 31.

The core 29 is formed of a dielectric material that transmits laser light to be used for generating near-field light. The laser light emitted from a laser diode (not illustrated) enters the core 29 and propagates through the core 29. The cladding layers 26, 30 and 33 and the interposition section 31 are each formed of a dielectric material that has a refractive index lower than that of the core 29. For example, the core 29 can be formed of tantalum oxide such as $Ta_2O_5$, SiON, or niobium oxide. The cladding layers 26, 30 and 33 and the interposition section 31 can be formed of alumina or $SiO_2$.

The third layers of the coupling sections 14A and 14B are embedded in the cladding layers 26 and 30. The third layer of the coupling section 14A and the third layer of the coupling section 14B are located on opposite sides of the core 29 in the track width direction (the X direction), each being at a distance from the core 29. The thermally-assisted magnetic recording head further includes: a main pole 27 formed of a magnetic material, lying on the cladding layer 26 and interposed between the front end face 29a of the core 29 and the medium facing surface 80; and a heat sink 28 lying on the cladding layer 26 and surrounding the main pole 27. The interposition section 31 is interposed between the main pole 27 and the core 29. The main pole 27 has a first end face 27a located in the medium facing surface 80, a second end face 27b located opposite to the first end face 27a, and two side surfaces 27c and 27d. The side surfaces 27c and 27d are shown in FIG. 2 to be described later. The heat sink 28 is in contact with the side surfaces 27c and 27d of the main pole 27. The cladding layer 30 is disposed around the heat sink 28. The heat sink 28 has the function of dissipating heat transferred from the plasmon generator 20 to the main pole 27 outwardly from the main pole 27. The heat sink 28 is formed of, for example, the same material as the heat sink 16.

The thermally-assisted magnetic recording head further includes a coupling layer 32 formed of a magnetic material and lying on the main pole 27. The coupling layer 32 has an end face located in the medium facing surface 80. The length of the coupling layer 32 in the Y direction which is perpendicular to the medium facing surface 80 increases with increasing distance from the main pole 27. The coupling layer 32 and the fourth layers of the coupling sections 14A and 14B are embedded in the cladding layer 33. The top surfaces of the coupling layer 32, the cladding layer 33, and the fourth layers of the coupling sections 14A and 14B are even with each other.

The thermally-assisted magnetic recording head further includes: a coupling layer 34 formed of a magnetic material and lying on the coupling layer 32; a coupling layer 35 formed of a magnetic material and lying on the coupling sections 14A and 14B and the cladding layer 33; and an insulating layer 36 lying on the cladding layer 33 and surrounding the coupling layers 34 and 35. The coupling layer 34 has an end face located in the medium facing surface 80. The insulating layer 36 is formed of alumina, for example.

The thermally-assisted magnetic recording head further includes: a coupling layer 37 formed of a magnetic material and lying on the coupling layer 34; a coupling layer 38 formed of a magnetic material and lying on the coupling layer 35; an insulating layer 39 lying on the insulating layer 36; a coil 40 lying on the insulating layer 39; and an insulating layer 41 provided around the coupling layers 37 and 38 to cover the insulating layer 39 and the coil 40. The coupling layer 37 has an end face facing toward the medium facing surface 80 and located at a distance from the medium facing surface 80. The top surfaces of the coupling layers 37 and 38 and the insulating layer 41 are even with each other. The coil 40 is wound around the coupling layer 38. The coil 40 is formed of a conductive material such as copper. The insulating layers 39 and 41 are formed of alumina, for example.

The thermally-assisted magnetic recording head further includes: a yoke layer 42 formed of a magnetic material and lying on the coupling layers 37 and 38 and the insulating layer 41; and an insulating layer 43 provided around the yoke layer 42. The yoke layer 42 magnetically couples the coupling layers 37 and 38 to each other. The yoke layer 42 has an end face facing toward the medium facing surface 80 and located at a distance from the medium facing surface 80. The insulating layer 43 is formed of alumina, for example.

The thermally-assisted magnetic recording head further includes a protective layer 44 disposed to cover the yoke layer 42 and the insulating layer 43. The protective layer 44 is formed of alumina, for example.

The parts from the return pole layer 11 to the yoke layer 42 constitute a write head unit. The coil 40 produces a magnetic field corresponding to data to be written on the recording medium 90. The shield 13, the return pole layer 11, the coupling sections 14A and 14B, the coupling layers 35 and 38, the yoke layer 42, the coupling layers 37, 34 and 32, and the main pole 27 form a magnetic path for passing a magnetic flux corresponding to the magnetic field produced by the coil 40. The main pole 27 passes the magnetic flux corresponding to the magnetic field produced by the coil 40, and produces a write magnetic field for use to write data on the recording medium 90 by means of a perpendicular magnetic recording system.

As has been described, the thermally-assisted magnetic recording head according to the present embodiment includes the medium facing surface 80, the read head unit, and the write head unit. The read head unit and the write head unit are stacked on the substrate 1. The write head unit is located on the trailing side, i.e., the front side in the direction of travel of the recording medium 90 (the Z direction), relative to the read head unit.

The write head unit includes the main pole 27, the waveguide, the plasmon generator 20, and the heat sink 16. The waveguide includes the core 29 and the cladding. The cladding includes the cladding layers 26, 30 and 33 and the interposition section 31.

The main pole 27 and the core 29 are located on the same side in the direction of travel of the recording medium 90 relative to the plasmon generator 20. In the present embodiment, the main pole 27 and the core 29 are located on the trailing side, i.e., the front side in the direction of travel of the recording medium 90, relative to the plasmon generator 20.

The heat sink 16 is located on a side of the plasmon generator 20 opposite to the main pole 27. In the present embodiment, the heat sink 16 is located on the leading side, i.e., the rear side in the direction of travel of the recording medium 90, relative to the plasmon generator 20.

Figure 1:
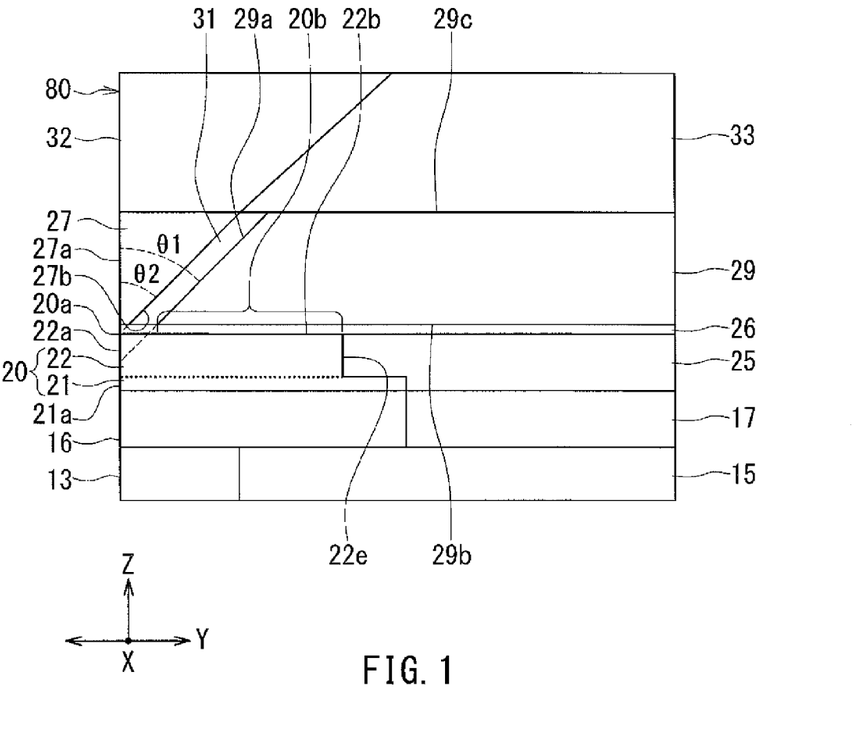
FIG. 1 is a cross-sectional view showing the main part of a thermally-assisted magnetic recording head according to a first embodiment of the invention.

The main pole 27 and the core 29 will now be described in more detail with reference to FIG. 1 and FIG. 2. FIG. 1 is a cross-sectional view showing the main part of the thermally-assisted magnetic recording head. FIG. 2 is a perspective view showing the main part of the thermally-assisted magnetic recording head. As previously mentioned, the main pole 27 has the first end face 27a, the second end face 27b, and the two side surfaces 27c and 27d. The core 29 has the front end face 29a, the evanescent light generating surface 29b, the top surface 29c, and the two side surfaces 29d and 29e. The front end face 29a of the core 29 is opposed to the second end face 27b of the main pole 27. The interposition section 31 is interposed between the front end face 29a of the core 29 and the second end face 27b of the main pole 27.

The front end face 29a of the core 29 and the second end face 27b of the main pole 27 are both inclined with respect to the medium facing surface 80 as follows. The front end face 29a of the core 29 is inclined with respect to the medium facing surface 80 such that the distance from the medium facing surface 80 to any point on the front end face 29a decreases with decreasing distance from the point on the front end face 29a to the plasmon generator 20. The second end face 27b of the main pole 27 is inclined with respect to the medium facing surface 80 such that the distance from the medium facing surface 80 to any point on the second end face 27b decreases with decreasing distance from the point on the second end face 27b to the plasmon generator 20. An inclination angle θ1 formed by the front end face 29a of the core 29 with respect to the medium facing surface 80 and an inclination angle θ2 formed by the second end face 27b of the main pole 27 with respect to the medium facing surface 80 may be equal. Both of the inclination angles θ1 and θ2 preferably fall within the range of 30° to 60°. The reason therefor will be described in detail later.

The shape of the plasmon generator 20 will now be described in detail with reference to FIG. 1 and FIG. 2. As shown in FIG. 1 and FIG. 2, the plasmon generator 20 includes a plate section 21 shaped like a plate, and a main body 22 located on the plate section 21. In FIG. 1 and FIG. 2 the boundary between the plate section 21 and the main body 22 is shown by a dotted line. In the present embodiment, the plate section 21 covers the entire top surface of the heat sink 16. This makes it possible to prevent the light propagating through the core 29 from being optically obstructed by the heat sink 16. The plate section 21 has a front end face 21a located in the medium facing surface 80.

The main body 22 has a front end face 22a, a top surface 22b, two side surfaces 22c and 22d, and a rear end face 22e. The front end face 22a is located in the medium facing surface 80. For example, the main body 22 is rectangular in cross section parallel to the medium facing surface 80. The thickness (the dimension in the Z direction) of the main body 22 is generally constant regardless of distance from the medium facing surface 80.

As shown in FIG. 2, the main body 22 includes a narrow portion 22A and a wide portion 22B. The narrow portion 22A is located near the medium facing surface 80. The wide portion 22B is located farther from the medium facing surface 80 than is the narrow portion 22A. The narrow portion 22A includes the front end face 22a. The width of the narrow portion 22A in the track width direction (the X direction) may be constant regardless of distance from the medium facing surface 80, or may decrease toward the medium facing surface 80. The wide portion 22B is located on a side of the narrow portion 22A opposite to the front end face 22a and is connected to the narrow portion 22A. The width of the wide portion 22B is equal to that of the narrow portion 22A at the boundary between the narrow portion 22A and the wide portion 22B, and is greater than that of the narrow portion 22A in the other positions.

The width (the dimension in the track width direction (the X direction)) of the front end face 22a is defined by the width of the narrow portion 22A in the medium facing surface 80. The width of the front end face 22a falls within the range of 5 to 60 nm, for example.

The plasmon generator 20 has a near-field light generating section 20a located in the medium facing surface 80, and a plasmon exciting section 20b located at a predetermined distance from the evanescent light generating surface 29b and facing the evanescent light generating surface 29b. In the present embodiment, the near-field light generating section 20a is constituted by a corner defined at the front end face 22a of the main body 22 by intersection of the front end face 22a and the top surface 22b of the main body 22, or constituted by the corner and a portion of the front end face 22a located around the corner. The plasmon exciting section 20b is constituted by a portion of the top surface 22b of the main body 22 that is opposed to the evanescent light generating surface 29b. The cladding layer 26 includes a portion interposed between the evanescent light generating surface 29b and the plasmon exciting section 20b.

Now, the principle of generation of near-field light in the present embodiment and the principle of thermally-assisted magnetic recording using near-field light will be described in detail. Laser light emitted from a laser diode (not illustrated) enters the core 29. As shown in FIG. 3, the laser light 50 propagates through the core 29 toward the medium facing surface 80, and reaches the vicinity of the plasmon generator 20. The evanescent light generating surface 29b of the core 29 generates evanescent light based on the laser light 50 propagating through the core 29. More specifically, the laser light 50 is totally reflected at the evanescent light generating surface 29b, and the evanescent light generating surface 29b thereby generates evanescent light that permeates into the cladding layer 26. In the plasmon generator 20, surface plasmons are excited on the plasmon exciting section 20b through coupling with the aforementioned evanescent light. The surface plasmons propagate to the near-field light generating section 20a, and the near-field light generating section 20a generates near-field light based on the surface plasmons.

The near-field light generated from the near-field light generating section 20a is projected toward the recording medium 90, reaches the surface of the recording medium 90 and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 27 for data writing.

The specific functions and effects of the thermally-assisted magnetic recording head according to the present embodiment will now be described. In the present embodiment, the main pole 27 and the core 29 are located on the same side in the direction of travel of the recording medium 90 relative to the plasmon generator 20. The present embodiment thus allows the first end face 27a of the main pole 27 and the near-field light generating section 20a of the plasmon generator 20 to be located closer to each other in the medium facing surface 80 by the height of the plasmon generator 20 in the medium facing surface 80 when compared with the case where the core 29 is located on a side of the plasmon generator 20 opposite to the main pole 27. This makes it possible to increase the linear recording density.

When the core 29 is located on a side of the plasmon generator 20 opposite to the main pole 27, reducing the thickness of the plasmon generator 20 would bring the first end face 27a of the main pole 27 and the near-field light generating section 20a of the plasmon generator 20 closer to each other. However, reducing the thickness of the plasmon generator 20 makes the plasmon generator 20 smaller in volume and thus more likely to rise in temperature. This consequently makes the plasmon generator 20 susceptible to damage. In contrast, the present embodiment allows the plasmon generator 20 to be large in thickness while allowing the first end face 27a of the main pole 27 and the near-field light generating section 20a of the plasmon generator 20 to be located close to each other, Further, according to the present embodiment, the heat sink 16 can be provided on a side of the plasmon generator 20 opposite to the main pole 27. By virtue of the foregoing, the present embodiment makes it possible to reduce a temperature rise of the plasmon generator 20 and to thereby prevent damage to the plasmon generator 20.

Further, in the present embodiment, the front end face 29a of the core 29 is opposed to the second end face 27b of the main pole 27. Thus, when light propagating through the core 29 reaches the front end face 29a and emerges therefrom, part of the light may enter the main pole 27 to cause a temperature rise of the main pole 27. If a large amount of light enters the main pole 27, the main pole 27 would get hot and become susceptible to damage. To cope with this, in the present embodiment, the cladding includes the interposition section 31 interposed between the front end face 29a of the core 29 and the second end face 27b of the main pole 27. Further, the front end face 29a of the core 29 and the second end face 27b of the main pole 27 are inclined with respect to the medium facing surface 80. Thus, according to the present embodiment, at least part of the light propagating through the core 29 and reaching the front end face 29a is reflected to allow a smaller amount of light to emerge from the front end face 29a of the core 29 and enter the main pole 27. The present embodiment thereby makes it possible to prevent damage to the main pole 27.

Further, in the present embodiment, the heat sink 28 is provided around the main pole 27. The heat sink 28 prevents part of the light that emerges from the front end face 29a of the core 29 from passing through the surrounding areas of the main pole 27 and reaching the recording medium 90. As a result, the present embodiment allows for improvement of signal-to-noise ratio.

Now, a preferable range of the inclination angle θ1 of the front end face 29a of the core 29 will be discussed. An excessively small inclination angle θ1 would cause the front end face 29a of the core 29 to have an excessively high light transmittance, thereby causing an excessively large amount of light to emerge from the front end face 29a of the core 29 and enter the main pole 27. It is thus preferred that the inclination angle θ1 be large to some extent, more specifically, 30° or more.

The inclination angle θ1 is equal to the incident angle at which the light propagating through the core 29 impinges on the front end face 29a. When the incident angle is greater than or equal to the critical angle, the light propagating through the core 29 is totally reflected off the front end face 29a. The inclination angle θ1 is thus preferably greater than or equal to the critical angle.

On the other hand, an excessively large inclination angle θ1 would cause a portion of the core 29 near the plasmon generator 20 to be small in volume, thereby making the core 29 unable to propagate a sufficient amount of light to the vicinity of the plasmon generator 20. The inclination angle θ1 is thus preferably 60° or smaller.

As will be described in detail later, the main pole 27 is formed after the front end face 29a of the core 29 is formed. The inclination angle θ2 of the second end face 27b of the main pole 27 thus depends on the inclination angle θ1 of the front end face 29a of the core 29. The inclination angle θ2 of the second end face 27b of the main pole 27 has a preferable range which is the same as that of the inclination angle θ1.

According to the present embodiment, since the front end face 29a of the core 29 is inclined, the edge of the evanescent light generating surface 29b closest to the medium facing surface 80 and the end of the plasmon exciting section 20b closest to the medium facing surface 80 can be at a smaller distance from the medium facing surface 80 than in the case where the front end face 29a of the core 29 is parallel to the medium facing surface 80. This makes it possible to excite surface plasmons near the near-field light generating section 20a located in the medium facing surface 80 and to propagate the excited surface plasmons to the near-field light generating surface 20a over a small distance. As a result, it becomes possible to generate near-field light with efficiency.

A manufacturing method for the thermally-assisted magnetic recording head according to the present embodiment will now be described with reference to FIG. 3 and FIG. 4. The manufacturing method for the thermally-assisted magnetic recording head includes the steps of: forming components of a plurality of thermally-assisted magnetic recording heads, except the substrates 1, on a wafer that includes portions to become the substrates 1 of the plurality of thermally-assisted magnetic recording heads, thereby fabricating a substructure including a plurality of pre-head portions arranged in rows, the plurality of pre-head portions becoming individual thermally-assisted magnetic recording heads later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads are produced in this manner.

The manufacturing method for the thermally-assisted magnetic recording head according to the present embodiment will be described in more detail below with attention focused on a single thermally-assisted magnetic recording head. The manufacturing method for the thermally-assisted magnetic recording head starts with forming the insulating layer 2 on the substrate 1. Then, the bottom shield layer 3 is formed on the insulating layer 2. Next, the insulating layer 4 is formed to cover the bottom shield layer 3. The insulating layer 4 is then polished by, for example, chemical mechanical polishing (hereinafter referred to as CMP), until the bottom shield layer 3 is exposed. Next, the MR element 5 and the insulating layer 6 are formed on the bottom shield layer 3 and the insulating layer 4. The top shield layer 7 is then formed on the MR element 5 and the insulating layer 6. Next, the insulating layer 8 is formed to cover the top shield layer 7. The insulating layer 8 is then polished by, for example, CMP, until the top shield layer 7 is exposed.

Next, the nonmagnetic layer 10 is formed on the top shield layer 7 and the insulating layer 8. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. The shield 13 and the first layers of the coupling sections 14A and 14B are then formed on the return pole layer 11. Next, the insulating layer 15 is formed over the entire top surface of the stack. The insulating layer 15 is then polished by, for example, CMP, until the shield 13 and the first layers of the coupling sections 14A and 14B are exposed.

Next, the heat sink 16 is formed on the shield 13 and the insulating layer 15. Then, the insulating layer 17 is formed to cover the heat sink 16. The insulating layer 17 is then polished by, for example, CMP, until the heat sink 16 is exposed. Next, an initial plasmon generator is formed on the heat sink 16. The initial plasmon generator is then selectively etched by, for example, ion beam etching (hereinafter referred to as IBE) or reactive ion etching (hereinafter referred to as RIE), or IBE and RIE in combination, so as to make the initial plasmon generator into the plasmon generator 20. More specifically, part of the initial plasmon generator is etched to provide the initial plasmon generator with the main body 22 (see FIG. 1 and FIG. 2). This etching process is stopped before the part of the initial plasmon generator being etched is completely removed. It is thereby possible to form the plate section 21 (see FIG. 1 and FIG. 2) having the function described previously.

Next, the insulating layer 17 is selectively etched to form therein two openings for exposing the top surfaces of the first layers of the coupling sections 14A and 14B. The second layers of the coupling sections 14A and 14B are then formed on the first layers of the coupling sections 14A and 14B, respectively. Next, the dielectric layer 25 is formed over the entire top surface of the stack. The dielectric layer 25 is then polished by, for example, CMP, until the plasmon generator 20 and the second layers of the coupling sections 14A and 14B are exposed.

Next, the cladding layer 26 is formed over the entire top surface of the stack. An initial core, which will later become the core 29, is then formed on the cladding layer 26. The initial core is formed by, for example, first forming a dielectric layer on the cladding layer 26 and then patterning the dielectric layer into the initial core by IBE or RIE, for example. Then, the cladding layer 26 is selectively etched to form therein two openings for exposing the top surfaces of the second layers of the coupling sections 14A and 14B. The third layers of the coupling sections 14A and 14B are then formed on the second layers of the coupling sections 14A and 14B, respectively. Next, the cladding layer 30 is formed over the entire top surface of the stack. The cladding layer 30 is then polished by, for example, CMP, until the initial core and the third layers of the coupling sections 14A and 14B are exposed. The top surfaces of the initial core, the third layers of the coupling sections 14A and 14B, and the cladding layer 30 are thereby made even with each other.

Next, a part of the initial core in the vicinity of the location at which the medium facing surface 80 is to be formed is taper-etched by, for example, IBE, so as to provide the initial core with the front end face 29a of the core 29. This makes the initial core into the core 29. Where IBE is employed to etch the initial core, the ion beams are allowed to travel in a direction at an angle with respect to the direction perpendicular to the top surface 1a of the substrate 1. The inclination angle θ1 of the front end face 29a of the core 29 with respect to the medium facing surface 80 can be adjusted by the angle that the direction of travel of the ion beams forms with respect to the direction perpendicular to the top surface 1a of the substrate 1. This etching process also etches a portion of the cladding layer 30. Next, the interposition section 31 is formed to cover the front end face 29a of the core 29. The interposition section 31 may thereafter be etched into a desired thickness.

Next, the main pole 27 and the heat sink 28 are formed. To form the main pole 27 and the heat sink 28, the following first and second methods are conceivable. The first method will now be described. According to the first method, an initial heat sink is first formed on the cladding layer 26 and the interposition section 31. The initial heat sink is then selectively etched by, for example, IBE or RIE, or IBE and RIE in combination, so as to form in the initial heat sink a receiving section for receiving the main pole 27. This makes the initial heat sink into the heat sink 28. The receiving section is shaped to correspond to the shape of the main pole 27. The main pole 27 is then formed in the receiving section.

The second method will now be described. According to the second method, a seed layer (not illustrated) is first formed on the top surface of the stack. Then, a photoresist mask is formed on the seed layer. The photoresist mask has an opening shaped to correspond to the shape of the main pole 27. Using the seed layer as an electrode and a seed, the main pole 27 is then formed by plating in the opening of the photoresist mask. The photoresist mask is then removed. Next, a portion of the seed layer that is not covered with the main pole 27 is removed by, for example, IBE, using the main pole 27 as an etching mask. The heat sink 28 is then formed around the main pole 27.

Steps to follow the formation of the main pole 27 and the heat sink 28 will now be described. First, the fourth layers of the coupling sections 14A and 14B are formed on the third layers of the coupling sections 14A and 14B, respectively. Next, the cladding layer 33 is formed over the entire top surface of the stack. The cladding layer 33 is then polished by, for example, CMP, until the fourth layers of the coupling sections 14A and 14B are exposed. Then, part of the cladding layer 33 is etched by, for example, IBE, so as to form in the cladding layer 33 a receiving section for receiving the coupling layer 32. The coupling layer 32 is then formed in the receiving section. Next, the coupling layer 34 is formed on the coupling layer 32 and the cladding layer 33, and the coupling layer 35 is formed on the fourth layers of the coupling sections 14A and 14B and the cladding layer 33. Then, the insulating layer 36 is formed over the entire top surface of the stack. The insulating layer 36 is then polished by, for example, CMP, until the coupling layers 34 and 35 are exposed.

Next, the insulating layer 39 is formed over the entire top surface of the stack. The insulating layer 39 is then selectively etched to form therein an opening for exposing the top surface of the coupling layer 34 and an opening for exposing the top surface of the coupling layer 35. Next, the coupling layer 37 is formed on the coupling layer 34, and the coupling layer 38 is formed on the coupling layer 35. The coil 40 is then formed on the insulating layer 39. Next, the insulating layer 41 is formed over the entire top surface of the stack. The insulating layer 41 is then polished by, for example, CMP, until the coupling layers 37 and 38 are exposed. Then, the yoke layer 42 is formed on the coupling layers 37 and 38 and the insulating layer 41. The insulating layer 43 is then formed over the entire top surface of the stack. The insulating layer 43 is then polished by, for example, CMP, until the yoke layer 42 is exposed. Then, the protective layer 44 is formed to cover the yoke layer 42 and the insulating layer 43. Wiring, terminals, and other components are then formed on the top surface of the protective layer 44. When the substructure is completed thus, the step of forming the medium facing surface 80 is performed. A protective film for covering the medium facing surface 80 may be formed thereafter. Being provided with the medium facing surface 80, each pre-head portion becomes a thermally-assisted magnetic recording head.

The step of forming the medium facing surface 80 includes the step of polishing the surface of each pre-head portion that has resulted from cutting the substructure, and the step of forming a rail on the polished surface for allowing the slider to fly.

Second Embodiment

Figure 5:
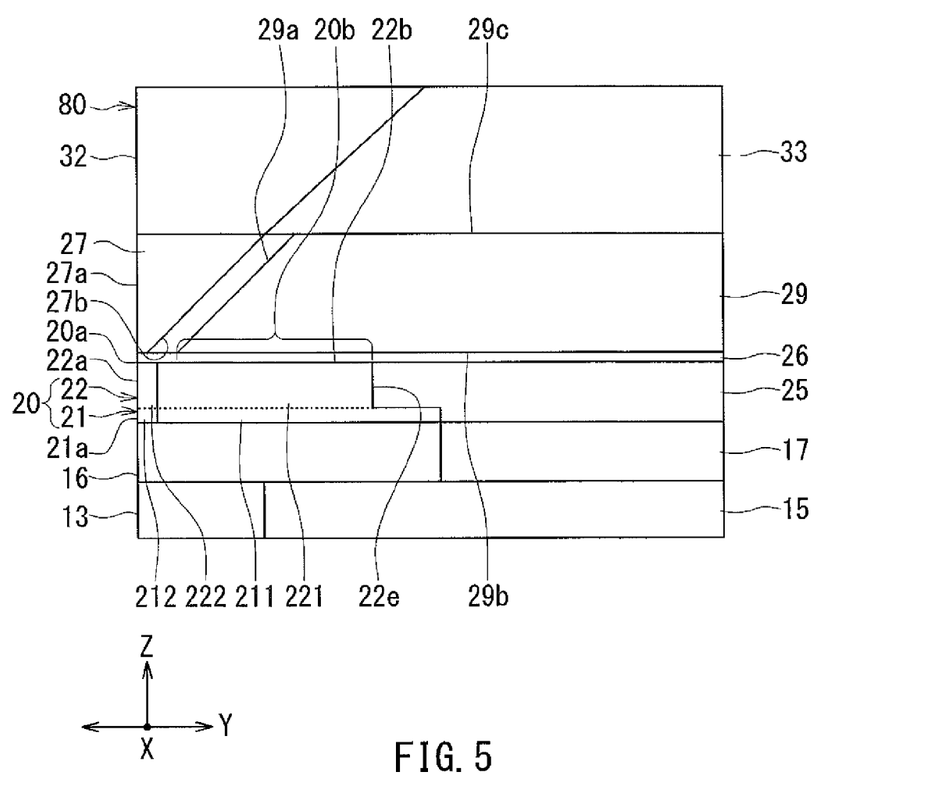
FIG. 5 is a cross-sectional view showing the main part of a thermally-assisted magnetic recording head according to a second embodiment of the invention.

A thermally-assisted magnetic recording head according to a second embodiment of the invention will now be described with reference to FIG. 5. FIG. 5 is a cross-sectional view showing the main part of the thermally-assisted magnetic recording head according to the present embodiment.

The thermally-assisted magnetic recording head according to the present embodiment differs from the head according the first embodiment in the following ways. In the present embodiment, the plate section 21 of the plasmon generator 20 includes a first portion 211 formed of a first metal material, and a second portion 212 formed of a second metal material different from the first metal material. The first portion 211 is located at a distance from the medium facing surface 80. The second portion 212 includes the front end face 21a of the plate section 21.

In the present embodiment, the main body 22 of the plasmon generator 20 includes a first portion 221 formed of the first metal material, and a second portion 222 formed of the second metal material. The first portion 221 is located at a distance from the medium facing surface 80. The second portion 222 includes the front end face 22a of the main body 22. In FIG. 5, the boundary between the first portion 211 of the plate section 21 and the first portion 221 of the main body 22 and the boundary between the second portion 212 of the plate section 21 and the second portion 222 of the main body 22 are each shown by a dotted line.

The first portion 221 of the main body 22 constitutes the principal part of the plasmon generator 20. In the present embodiment, the plasmon exciting section 20b is constituted by a portion of the top surface 22b of the main body 22 that is included in the first portion 221. To excite a lot of surface plasmons on the plasmon generator 20 and propagate the surface plasmons efficiently, it is thus preferred that the first metal material be a material having a high electrical conductivity. Examples of such a material include Au and an alloy predominantly composed of Au. On the other hand, the second portion 212 of the plate section 21 and the second portion 222 of the main body 22 are exposed in the medium facing surface 80. The second metal material is thus preferably a material having high mechanical strength and high thermal stability. Examples of such a material include Ru and Rh.

The present embodiment makes it possible to prevent the plasmon generator 20 from being mechanically damaged and broken, and from being deformed due to heat generated by the plasmon generator 20, without compromising the function of the plasmon generator 20.

A manufacturing method for the thermally-assisted magnetic recording head according to the present embodiment will now be described briefly. The manufacturing method for the thermally-assisted magnetic recording head according to the present embodiment is the same as the manufacturing method according to the first embodiment up to the step of polishing the insulating layer 17. The next step in the present embodiment is to form a second metal film on the heat sink 16. The second metal film is formed of the second metal material. On the second metal film, a photoresist mask is then formed to cover the location at which the medium facing surface 80 is to be formed and the vicinity thereof. The second metal film is then etched by, for example, IBE, using the photoresist mask. Next, formed is a first metal film of the first metal material. The photoresist mask is then removed. The first and second metal films are then polished by, for example, CMP, so as to make the top surfaces thereof even with each other. Next, the first and second metal films polished are selectively etched by, for example, IBE or RIB, or IBE and RIE in combination, so that the first and second metal films become the plasmon generator 20. This makes the first metal film into the first portion 211 of the plate section 21 and the first portion 221 of the main body 22, and makes the second metal film into the second portion 212 of the plate section 21 and the second portion 222 of the main body 22. The subsequent steps are the same as those in the first embodiment.

The remainder of configuration, function and effects of the present embodiment are similar to those of the first embodiment.

Third Embodiment

Figure 6:
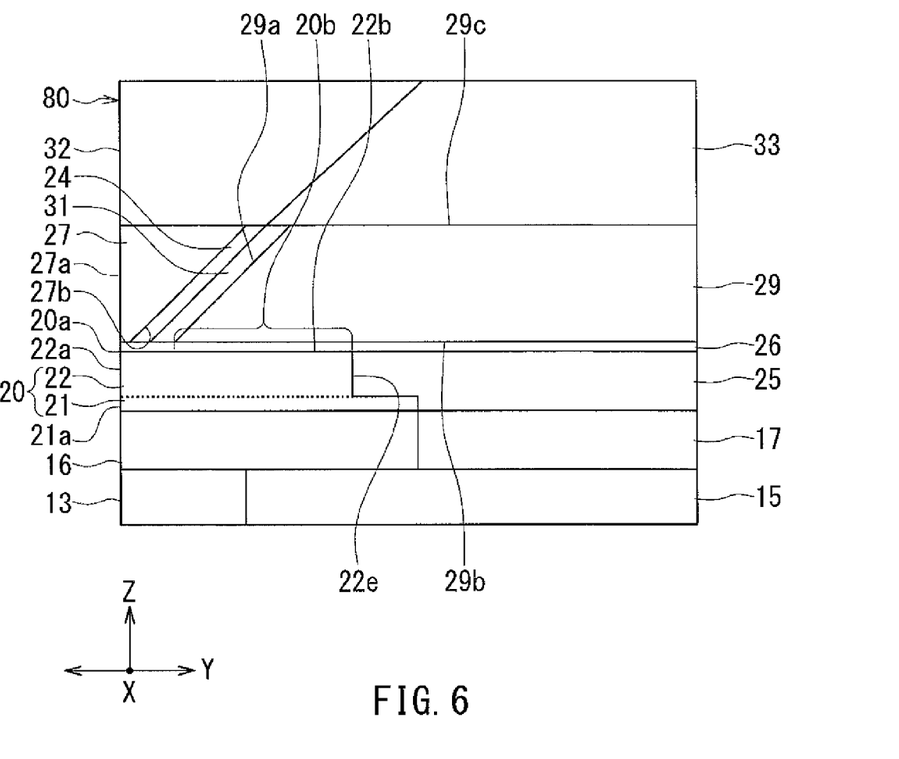
FIG. 6 is a cross-sectional view showing the main part of a thermally-assisted magnetic recording head according to a third embodiment of the invention.

A thermally-assisted magnetic recording head according to a third embodiment of the invention will now be described with reference to FIG. 6. FIG. 6 is a cross-sectional view showing the main part of the thermally-assisted magnetic recording head according to the present embodiment.

The thermally-assisted magnetic recording head according to the present embodiment differs from the head according to the first embodiment in the following ways. The thermally-assisted magnetic recording head according to the present embodiment includes a reflection film 24 interposed between the interposition section 31 and the second end face 27b of the main pole 27. The reflection film 24 is formed of, for example, one of Au, Cu, Al and Ag, or an alloy composed of two or more of these elements. The present embodiment makes it possible that the light having emerged from the front end face 29a of the core 29 and passed through the interposition section 31 is reflected by the reflection film 24 to achieve a further reduction in the amount of light entering the main pole 27. The present embodiment thus allows for more effective prevention of damage to the main pole 27.

A manufacturing method for the thermally-assisted magnetic recording head according to the present embodiment will now be described briefly. The manufacturing method for the thermally-assisted magnetic recording head according to the present embodiment is the same as the manufacturing method according to the first embodiment up to the step of forming the interposition section 31. The next step in the present embodiment is to form the reflection film 24 on the top surface of the stack. Then, the reflection film 24 except the portion thereof lying on the interposition section 31 is removed by IBE or RIE, or IBE and RIE in combination, for example. The main pole 27 and the heat sink 28 are then formed. The subsequent steps are the same as those in the first embodiment.

The remainder of configuration, function and effects of the present embodiment are similar to those of the first embodiment.

Fourth Embodiment

Figure 7:
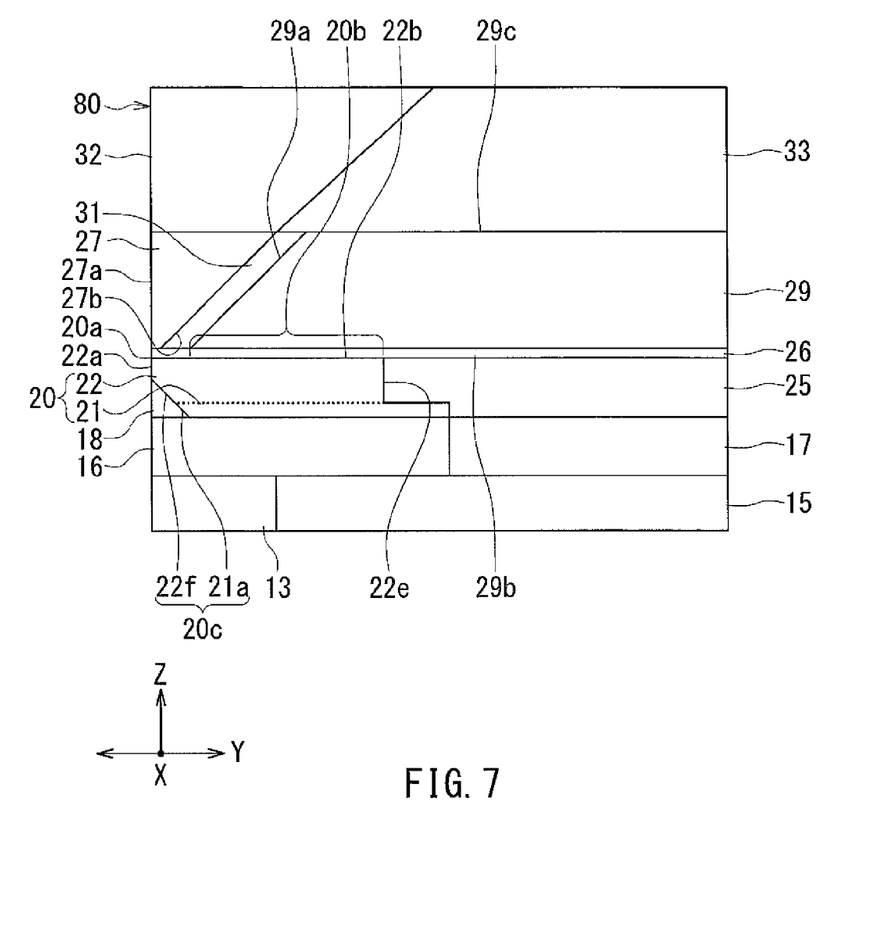
FIG. 7 is a cross-sectional view showing the main part of a thermally-assisted magnetic recording head according to a fourth embodiment of the invention.

A thermally-assisted magnetic recording head according to a fourth embodiment of the invention will now be described with reference to FIG. 7. FIG. 7 is a cross-sectional view showing the main part of the thermally-assisted magnetic recording head according to the present embodiment.

The thermally-assisted magnetic recording head according to the present embodiment differs from the head according to the first embodiment in the following ways. The plasmon generator 20 of the present embodiment has an inclined surface 20c located opposite to the plasmon exciting section 20b. The inclined surface 20c is inclined with respect to the direction perpendicular to the medium facing surface 80 such that the distance from the plasmon exciting section 20b to any point on the inclined surface 20c decreases with decreasing distance from the point on the inclined surface 20c to the medium facing surface 80.

Further, in the present embodiment, the front end face 21a of the plate section 21 of the plasmon generator 20 is located at a distance from the medium facing surface 80 and inclined with respect to the direction perpendicular to the medium facing surface 80. The main body 22 of the plasmon generator 20 has a connecting surface 22f in addition to the front end face 22a, the top surface 22b, the side surfaces 22c and 22d and the rear end face 22e. The connecting surface 22f connects the front end face 21a of the plate section 21 and the front end face 22a of the main body 22, and is inclined with respect to the direction perpendicular to the medium facing surface 80. The inclined surface 20c of the plasmon generator 20 is constituted by the front end face 21a of the plate section 21 and the connecting surface 22f of the main body 22.

The thermally-assisted magnetic recording head according to the present embodiment includes a dielectric layer 18 interposed between the inclined surface 20c of the plasmon generator 20 and the medium facing surface 80. The dielectric layer 18 is formed of alumina, for example.

In the present embodiment, the front end face 22a of the main body 22 has a smaller area than in the first embodiment. The present embodiment thus allows for generation of near-field light with a smaller spot diameter on the recording medium 90, and consequently allows for improvement of recording density.

A manufacturing method for the thermally-assisted magnetic recording head according to the present embodiment will now be described briefly. The manufacturing method for the thermally-assisted magnetic recording head according to the present embodiment is the same as the manufacturing method according to the first embodiment up to the step of forming the insulating layer 17. The next step in the present embodiment is to form an initial dielectric layer on the heat sink 16 and the insulating layer 17. Then, the initial dielectric layer is etched by, for example, IBE or RIE, or IBE and RIE in combination, so as to make the initial dielectric layer into the dielectric layer 18. Next, an initial plasmon generator is formed on the heat sink 16 and the dielectric layer 18. The subsequent steps are the same as those in the first embodiment.

The remainder of configuration, function and effects of the present embodiment are similar to those of the first embodiment.

The present invention is not limited to the foregoing embodiments, and various modifications may be made thereto. For example, as far as the requirements of the appended claims are met, the main pole 27, the core 29 and the plasmon generator 20 may be shaped and located in any desired manner, and need not necessarily be as in the respective examples illustrated in the foregoing embodiments.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A thermally-assisted magnetic recording head comprising:
    a medium facing surface configured to face a recording medium;
    a main pole for producing a write magnetic field for use to write data on the recording medium;
    a waveguide including a core through which light propagates, and a cladding provided around the core; and
    a plasmon generator including a near-field light generating section located in the medium facing surface, wherein
    the plasmon generator is configured so that a surface plasmon is excited on the plasmon generator based on the light propagating through the core, and the near-field light generating section generates near-field light based on the surface plasmon,
    the main pole and the core are located on a same side in a direction of travel of the recording medium relative to the plasmon generator,
    the main pole has a first end face located in the medium facing surface, and a second end face located opposite to the first end face,
    the core has a front end face opposed to the second end face of the main pole,
    the cladding includes an interposition section interposed between the front end face of the core and the second end face of the main pole,
    the front end face of the core is inclined with respect to the medium facing surface such that a distance from the medium facing surface to any point on the front end face decreases with decreasing distance from the point on the front end face to the plasmon generator, and
    the second end face of the main pole is inclined with respect to the medium facing surface such that a distance from the medium facing surface to any point on the second end face decreases with decreasing distance from the point on the second end face to the plasmon generator.

2. The thermally-assisted magnetic recording head according to claim 1, wherein each of the front end face of the core and the second end face of the main pole forms an inclination angle of 30° to 60° with respect to the medium facing surface.

3. The thermally-assisted magnetic recording head according to claim 1, wherein
    the core has an evanescent light generating surface configured to generate evanescent light based on the light propagating through the core,
    the plasmon generator includes a plasmon exciting section located at a predetermined distance from the evanescent light generating surface and facing the evanescent light generating surface, and
    the plasmon generator is configured so that a surface plasmon is excited on the plasmon exciting section through coupling with the evanescent light generated by the evanescent light generating surface, the surface plasmon propagates to the near-field light generating section, and the near-field light generating section generates near-field light based on the surface plasmon.

4. The thermally-assisted magnetic recording head according to claim 3, wherein the plasmon generator has an inclined surface located opposite to the plasmon exciting section, and the inclined surface is inclined with respect to a direction perpendicular to the medium facing surface such that a distance from the plasmon exciting section to any point on the inclined surface decreases with decreasing distance from the point on the inclined surface to the medium facing surface.

5. The thermally-assisted magnetic recording head according to claim 1, further comprising a heat sink located on a side of the plasmon generator opposite to the main pole.

6. The thermally-assisted magnetic recording head according to claim 1, further comprising a reflection film interposed between the interposition section and the second end face of the main pole.

* * * * *